(12) United States Patent
Lee

(10) Patent No.: US 11,361,757 B2
(45) Date of Patent: Jun. 14, 2022

(54) METHOD AND APPARATUS WITH SPEECH RECOGNITION

(71) Applicant: Samsung Electronics Co., Ltd., Suwon-si (KR)

(72) Inventor: Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 16/388,930

(22) Filed: Apr. 19, 2019

(65) Prior Publication Data
US 2020/0152180 A1     May 14, 2020

(30) Foreign Application Priority Data
Nov. 14, 2018   (KR) .................. 10-2018-0139787

(51) Int. Cl.
  *G10L 15/16*     (2006.01)
  *G06F 40/284*    (2020.01)
  *G06F 40/274*    (2020.01)

(52) U.S. Cl.
  CPC ........... *G10L 15/16* (2013.01); *G06F 40/274* (2020.01); *G06F 40/284* (2020.01)

(58) Field of Classification Search
  CPC ....... G10L 15/16; G06F 40/284; G06F 40/274
  See application file for complete search history.

(56) References Cited

U.S. PATENT DOCUMENTS

| | | | |
|---|---|---|---|
| 7,711,561 B2 | 5/2010 | Hogenhout et al. | |
| 9,858,265 B1 | 1/2018 | Mohaideen et al. | |
| 9,953,171 B2 | 4/2018 | Saxena et al. | |
| 9,990,918 B1 | 6/2018 | Chan et al. | |
| 2015/0066496 A1 | 3/2015 | Deoras et al. | |
| 2016/0350655 A1 | 12/2016 | Weiss et al. | |
| 2017/0315984 A1 | 11/2017 | Goyal et al. | |
| 2018/0150742 A1 | 5/2018 | Woulfe et al. | |
| 2018/0182376 A1 | 6/2018 | Van Gysel et al. | |
| 2019/0189111 A1* | 6/2019 | Watanabe | G06N 3/0454 |
| 2019/0278835 A1* | 9/2019 | Cohan | G06N 3/0454 |

OTHER PUBLICATIONS

See et al., "Get to the Point: Summarization with Pointer-Generator Networks", 2017, arXiv, whole document (Year: 2017).*
Shyu et al., "Order-Preserving Abstractive Summarization for Spoken Content Based on Connectionit Temporal Classification", 2017, arXiv, whole document (Year: 2017).*
Lu, Liang et al., "On Training the Recurrent Neural Network Encoder-decoder for Large Vocabulary End-To-End Speech Recognition", *2016 IEEE International Conference on Acoustics, Speech and Signal Processing (ICASSP)*, 2016 (pp. 5060-5064).

(Continued)

*Primary Examiner* — Sonia L Gay
(74) *Attorney, Agent, or Firm* — NSIP Law

(57) ABSTRACT

A processor-implemented decoding method in a first neural network is provided. The method predicts probabilities of candidates of an output token based on at least one previously input token, determines the output token among the candidates based on the predicted probabilities; and determines a next input token by selecting one of the output token and a pre-defined special token based on a determined probability of the output token.

38 Claims, 11 Drawing Sheets

(56) References Cited

OTHER PUBLICATIONS

Kim, Suyoun et al., "Joint CTC-Attention Based End-To-End Speech Recognition Using Multi-Task Learning", *2017 IEEE international conference on acoustics, speech and signal processing (ICASSP)*, 2017 (pp. 4835-4839).
Devlin, Jacob et al., "BERT: Pre-training of Deep Bidirectional Transformers for Language Understanding", *arXiv preprint arXiv*:1810. 04805, 2018 (pp. 1-14).
Extended European Search Report dated Apr. 17, 2020 for the corresponding European Application No. 19197732.1 (8 pages in English).
Hashem, Sherif, "Optimal Linear Combinations of Neural Networks", *Perdue University, School of Industrial Engineering*, Dec. 1993 (25 pages in English).
"Zhou, Ning et al., "Lexical Tone Recognition with an Artificial Neural Network", National Institutes of Health", Jun. 2008 (17 pages in English).
Cho, Kyunghyun et al., "Learning Phrase Representations using RNN Encoder-Decoder for Statistical Machine Translation", *Proceedings of the 2014 Conference on Empirical Methods in Natural Language Processing (EMNLP)*, Sep. 3, 2014 (pp. 1724-1734).
Yoon, Sangwoong et al., "Predictive Property of Hidden Representations in Recurrent Neural Network Language Model", *Seoul University, 2014 Winter Conference Proceedings*, 2014 (1 page in English and 3 pages in Korean).
Graves, Alex, "Generating Sequences with Recurrent Neural Networks", *CoRR*, Jun. 5, 2014 (pp. 1-43).
Ha, Seungdo, "Dialogue response generation using RNN-based sequence-to-sequence learning", Seoul National University, Feb. 2017 (2 pages in English and 54 pages in Korean).
Vaswani, Ashish, et al., "Attention is All You Need", $31^{st}$ *Conference on Neural Information Processing Systems, Long Beach*, California, USA, 2017 (11 pages in English).
Park, Han Shin et al., "High-performance HMM morpheme analyzer with AI-based auto-tagging for neologism", Korea Aerospace University, 2018 (1 page in English and 2 pages in Korean).

\* cited by examiner

METHOD AND APPARATUS WITH SPEECH RECOGNITION

CROSS-REFERENCE TO RELATED APPLICATIONS

This application claims the benefit under 35 USC § 119(a) of Korean Patent Application No. 10-2018-0139787 filed on Nov. 14, 2018 in the Korean Intellectual Property Office, the entire disclosure of which is incorporated herein by reference for all purposes.

BACKGROUND

1. Field

This application relates to a method and apparatus with speech recognition.

2. Description of Related Art

When a sequence with an undefined length is received as an input in an artificial neural network, an output of an undefined length may be generated. Typically, to address this problem, an encoder-decoder artificial neural network model, which is a type of sequence-to-sequence model, may be implemented. For example, a method of continuously outputting a subsequent output for each token corresponding to a unit constituting one sequence, based on a previous output of the neural network as an input, in order to calculate the output with the undefined length using the artificial neural network may be referred to as an auto-regressive decoding.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a processor-implemented decoding method in a first neural network comprises predicting probabilities of candidates of an output token based on at least one previously input token, determining the output token among the candidates based on the predicted probabilities, and determining a next input token by selecting one of the output token and a pre-defined special token based on a determined probability of the output token.

The special token may be determined to be the next input token, a reliability of candidates of a next output token predicted based on the special token is higher than a reliability of candidates of a next output token predicted based on the output token.

The determining of the output token may include selecting the output token from the candidates based on a combination of probabilities of the candidates predicted by one or more second neural networks interworking with the first artificial neural network, and probabilities of the candidates predicted by the first neural network.

An input layer of the neural network may include a plurality of nodes corresponding to each of the candidates, and a special node corresponding to the special token.

The at least one previously input token may include at least one of an output token previously predicted by the neural network and the special token.

The determining of the output token may include selecting a token having a highest probability among the candidates.

The method may be a recognition method using the first and the one or more second neural networks.

The determining of the next input token may include comparing a probability of the output token to a threshold probability, selecting the special token as the next input token when the probability of the output token is lower than the threshold probability, and selecting the output token as the next input token when the probability of the output token is higher than or equal to the threshold probability.

The predicting of the probabilities of the candidates of the output token may include predicting probabilities of the candidates of the output token based on a relationship between the at least one previously input token and the output token.

The method may further include determining a next output token based on the at least one previously input token and the next input token.

The method may further include masking the special token to prevent tokens other than the special token from attending to the special token.

The method may further include setting a relationship between the next output token and the special token to be less than or equal to a predetermined value when the special token is determined to be the next input token.

The determining of the output token may include determining whether the output token is similar to the special token, and determining a token having a second highest probability among the candidates to be the output token when the output token is similar to the special token.

In a general aspect, a processor-implemented decoding method in a first neural network includes predicting probabilities of candidates of an output token based on at least one previously input token, selecting the output token from the candidates based on a combination of probabilities of candidates predicted by one or more second neural networks interworking with the first neural network and probabilities of candidates predicted by the first neural network, comparing a probability of the output token in the first neural network and a probability of the output token in a determined neural network among the one or more second neural networks which has a highest probability of the output token, and determining a next input token in the first neural network by selecting one of the output token and a pre-defined special token based on a result of the comparing.

The determining of the next input token may include selecting the special token to be the next input token of the first neural network when a difference between the probability of the output token in the first neural network and the probability of the output token in the determined neural network is greater than or equal to a threshold value, and selecting the output token to be the next input token of the first neural network when a difference between the probability of the output token in the first neural network and the probability of the output token in the determined neural network is less than the threshold value.

The difference between the probability of the output token in the first neural network and the probability of the output token in the determined neural network is greater than or equal to the threshold value, a reliability of candidates of a next output token predicted based on the special token is higher than a reliability of candidates of a next output token predicted by the output token.

An input layer of the neural network may include a plurality of nodes corresponding to each of the candidates, and a special node corresponding to the special token.

The at least one previously input token may include at least one of an output token previously predicted by the artificial neural network and the special token.

The predicting of the probabilities of the candidates of the output token may include predicting probabilities of the candidates of the output token based on a relationship between the at least one previously input token and the output token.

The method may include determining a next output token based on the at least one previously input token and the next input token.

The method may include masking the special token to prevent tokens other than the special token from attending to the special token.

The method may include setting a relationship between the next output token and the special token to be less than or equal to a predetermined value when the special token is determined to be the next input token.

The determining of the output token may include determining whether the output token is similar to the special token, and determining a token having a second highest probability among the candidates to be the output token when the output token is similar to the special token.

In a general aspect, a speech recognition apparatus includes one or more processors configured to implement at least a first neural network including the one or more processors configured to predict probabilities of candidates of an output token based on at least one previously input token input, determine the output token among the candidates based on the predicted probabilities, and determine a next input token by selecting one of the output token and a pre-defined special token based on a determined probability of the output token.

When the special token is determined to be the next input token, a reliability of candidates of a next output token predicted based on the special token may be higher than a reliability of candidates of a next output token predicted based on the output token.

An input layer of the neural network may include a plurality of nodes corresponding to each of the candidates, and a special node corresponding to the special token.

The at least one previously input token may include at least one of an output token previously predicted by the neural network and the special token.

The one or more processors may be configured to select a token having a highest probability among the candidates.

The one or more processors may be further configured to implement one or more second neural networks, and wherein the one or more processors are further configured to select the output token from the candidates based on a combination of probabilities of the candidates predicted by a second neural network interworking with the first neural network, and probabilities of the candidates predicted by the first neural network.

The one or more processors may be further configured to compare a probability of the output token to a threshold probability, select the special token as the next input token when the probability of the output token is lower than the threshold probability, and select the output token as the next input token when the probability of the output token is higher than or equal to the threshold probability.

The one or more processors may be further configured to predict probabilities of the candidates of the output token based on a relationship between the at least one previously input token and the output token.

The one or more processors may be further configured to determine a next output token based on the at least one previously input token and the next input token.

The one or more processors may be further configured to mask the special token to prevent tokens other than the special token from attending to the special token.

The one or more processors may be further configured to set a relationship between the next output token and the special token to be less than or equal to a predetermined value when the special token is determined to be the next input token.

The one or more processors may be further configured to determine whether the output token is similar to the special token, and determine a token having a second highest probability among the candidates to be the output token when the output token is similar to the special token.

In a general aspect, a speech recognition apparatus includes one or more processors configured to implement at least a first neural network including the processor configured to predict probabilities of candidates of an output token based on at least one previously input token, select the output token from the candidates based on a combination of probabilities of the candidates predicted by one or more second neural networks interworking with the first neural network and probabilities of the candidates predicted by the first neural network, compare a probability of the output token in the first neural network and a probability of the output token in a determined neural network among the one or more second neural networks which has a highest probability of the output token, and determine a next input token in the first neural network by selecting one of the output token and a pre-defined special token based on a result of the comparing.

The one or more processors may be further configured to select the special token to be the next input token of the first neural network when a difference between the probability of the output token in the first neural network and the probability of the output token in the determined neural network is greater than or equal to a threshold value, and select the output token to be the next input token of the first neural network when a difference between the probability of the output token in the first neural network and the probability of the output token in the determined neural network is less than the threshold value.

When a difference between the probability of the output token in the first neural network and the probability of the output token in the determined neural network is greater than or equal to the threshold value, a reliability of candidates of a next output token predicted based on the special token is higher than a reliability of candidates of a next output token predicted by the output token.

In a general aspect, a speech recognition system includes one or more processors, one or more memories, storing instructions that, when executed by the one or more processors, configured the one or more processors to extract a speech feature from an input speech signal and generate an encoded feature, determine probabilities of candidates of an output token based on the encoded feature and a previously determined recognition result, and determine a next output token based on a determined weight of candidates generated by a language model neural network, and a determined weight of candidates determined by a speech recognition neural network.

Other features and aspects will be apparent from the following detailed description, the drawings, and the claims.

Figure 1:
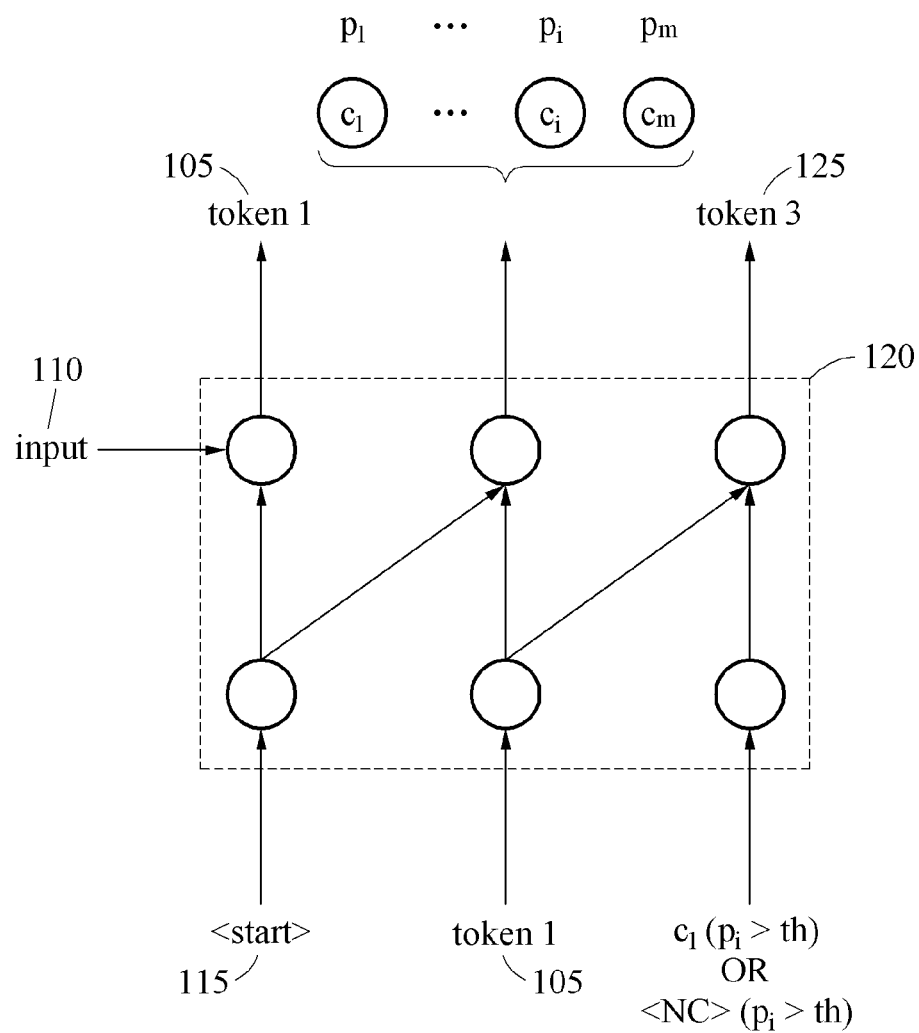
FIG. 1 illustrates an example of an auto-regressive decoding method in an artificial neural network, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. Like numbers refer to like elements throughout.

FIG. 1 is a diagram illustrating an example of an auto-regressive decoding method in an artificial neural network.

Referring to FIG. 1, a decoder 120 receives an encoded feature 110 as an input. For example, the decoder 120 receives an input, e.g., from an example encoder in an embodiment, connected to a front end of the decoder 120 in an artificial neural network.

The encoder and the decoder 120 may be a sequence-to-sequence encoder-decoder implemented by an encoder-decoder neural network. A neural network may be a deep neural network (DNN), as a non-limiting example. In such an example, the DNN may include one or more of a fully connected network, a deep convolutional network, a recurrent neural network (RNN), a recurrent deep neural network (RDNN), and/or a bidirectional recurrent neural network (BDRNN) may include different or overlapping neural network portions respectively with such full, convolutional, recurrent connections, and/or bidirectional recurrent connections. Nodes of layers in the neural network may non-linearly affect each another. Also, parameters of the neural network such as values output from each of the nodes, connectional relationships between the nodes, and similar parameters may be optimized through learning, e.g., through loss-based back propagation.

The neural networks may be processor implemented neural network models, and various processes may be implemented through the neural network models as specialized computational architectures, which after substantial training may provide computationally intuitive mappings between input patterns and output patterns or pattern recognitions of input patterns, as non-limiting examples. The trained capability of generating such mappings or performing such example pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

In an example, the sequence-to-sequence encoder-decoder may have a network structure in which an encoder and a decoder are integrated, and may generate a sequence of recognition results from an input sequence. For example, the encoder and the decoder 120 implemented by the sequence-to-sequence structure may generate recognition results corresponding to an input speech from the input speech. The example integrated encoder and the decoder 120 may be pre-trained to generate a sequence of recognition results from an input sequence, e.g., initially trained prior to the receipt of the input speech.

The use of the term "may" herein with respect to an example or embodiment, e.g., as to what an example or embodiment may include or implement, means that at least one example or embodiment exists where such a feature is included or implemented while all examples and embodiments are not limited thereto.

The encoder generates the encoded feature 110 by encoding the input sequence. The encoder generates encoded information by extracting a feature from the input sequence. The encoded feature 110 is applied to the decoder 120. The decoder 120 generates a recognition result based on the encoded feature 110.

Referring to FIG. 1, the decoder 120, having received the encoded feature 110, determines a token1 105 to be an output token based on a start token 115 corresponding to an input token. The decoder 120, having determined the token1 105 as the output token, determines the token1 105 to be a next input token.

In the encoder-decoder structure artificial neural network, the decoder 120 acquires an output token based on information calculated by the encoder for each step. In this example, the decoder 120 acquires the output token depending on input tokens selected up to a previous step.

For example, the decoder 120 having determined the token1 105 as the input token predicts probabilities of candidates of the output token based on the token1 105. $c_1$ through $c_m$ denote candidates of an output token. $p_1$ through $p_m$ denote probabilities of the candidates. Based on the probabilities, an output token is determined from the candidates. For example, a token having a highest probability is selected from the candidates to be the output token.

A conditional probability of a token $t_i$ at a step i may be expressed as shown in Equation 1 below, for example.

$$p(t_i | t_1, t_2, \ldots, t_{i-1}, H_e) \tag{1}$$

In Equation 1, $H_e$ denotes a hidden representation of the encoder and corresponds to the encoded feature 110. $t_1$ through $t_{i-1}$ denote input tokens selected so far. For ease of description, although FIG. 1 illustrates that the encoded feature 110 is applied to a node of a first step in the decoder 120, the encoded feature 110 may also be similarly applied to other nodes thereafter.

Typically, in a sequence-to-sequence model which performs auto-regressive decoding, a token selected as an output token is determined to be a next input token. Since the output token is determined depending on input tokens selected up to the previous step, when the next input token is selected as the output token in the sequence-to-sequence model, a performance of predicting a next token may be degraded due to the selected output token.

For example, among the candidates $c_1$ through $c_m$ of the output token, $c_i$ having a lower probability may be determined to be the output token. Due to a characteristic of generating the subsequent output based on previous tokens, when a next token is to be generated based on tokens having relatively low probabilities in such a typical process of auto-regressive decoding, it may be difficult to efficiently generate subsequent tokens if probabilities of previous tokens are relatively low. For example, although $c_i$ has a highest probability, probabilities of $c_1$ through $c_m$ may be low overall. As an example, in an environment in which model ensemble auto-regressive decoding is performed by selecting and using one of tokens generated in various artificial neural network models, a next token may be generated based on a token generated by another artificial neural network as an ensemble result.

Thus, when a probability of an input token is relatively low, an artificial neural network may not accurately predict t corresponding to an output token based on the relation $$p(t_i | t_1, t_2, \ldots, t_{i-1}, H_e)$$

In an example, such an issue may be solved if a probability is calculated by excluding the token in Equation 1 related to the conditional probability in order to accurately predict the output token $t_i$ based on the input token $t_{i-1}$ having the lower probability. However, since the conditional probability may be learned from learning data, if the conditional probability is calculated independently of the previous token, an original goal of the neural network may not be achieved or accurately substantially lowered.

In an example of the decoding method herein, a special token $t_{NC}$ that does not affect the conditional probability may be used to accurately predict the output token $t_i$ even when the probability of the input token $t_{i-1}$ is low.

Referring to FIG. 1, a probability $p_i$ of the output token $c_i$ determined as an output for the token1 105 is compared with a threshold probability $\theta_n$. The threshold probability $\theta_{nc}$ may be a predetermined value, for example, a minimum value of an input token probability by which a desired output is to be obtained. For example, it may be determined that a desired output may be obtained when the probability $p_i$ of the output token $c_i$ is higher than the threshold probability $\theta_{nc}$. In this example, the output token $c_i$ is determined to be a next input token.

If the probability $p_i$ of the output token $c_i$ is lower than the threshold probability $\theta_{nc}$, it may be determined that a desired output may not be obtained when the output token $c_i$ is determined to be a next input token. Thus, if the probability $p_i$ of the output token $c_i$ is lower than the threshold probability $θ_{nc}$, the output token $c_i$ may not be determined or used as a next input token. In this example, a pre-defined special token NC is determined to be, or used as, the next input token instead of the output token $c_i$.

A reliability of candidates of a next output token predicted based on a special token may be higher than a reliability of candidates of a next output token predicted based on an output token having a probability lower than a threshold probability. The artificial neural network may be pre-trained to satisfy such characteristics. A method of training the artificial neural network will be described in detail later. When the probability $p_i$ of the output token $c_i$ is lower than the threshold probability $θ_{nc}$, a reliability of candidates of a next output token predicted based on the special token NC may be higher than a reliability of candidates of a next output token predicted based on $c_i$.

A reliability may refer to a reliability of a token that is a degree closer to a correct answer token with regard to the learning data. When the probability $p_i$ of the output token $c_i$ is lower than the threshold probability $θ_{nc}$, an output token having a highest probability among the candidates of the next output token predicted based on the special token NC may be closer to the correct answer token in comparison to an output token having a highest probability among the candidates of the next output token predicted based on $c_i$.

When the artificial neural network determines a next input token by selecting one of the output token and the special token, a next output token may be determined based on at least one input token and the next input token. When the special token NC is determined as the next input token, the artificial neural network determines a token3 125 corresponding to the next output token based on the token1 105 corresponding to the input token and the special token NC corresponding to the next input token.

Figure 2:
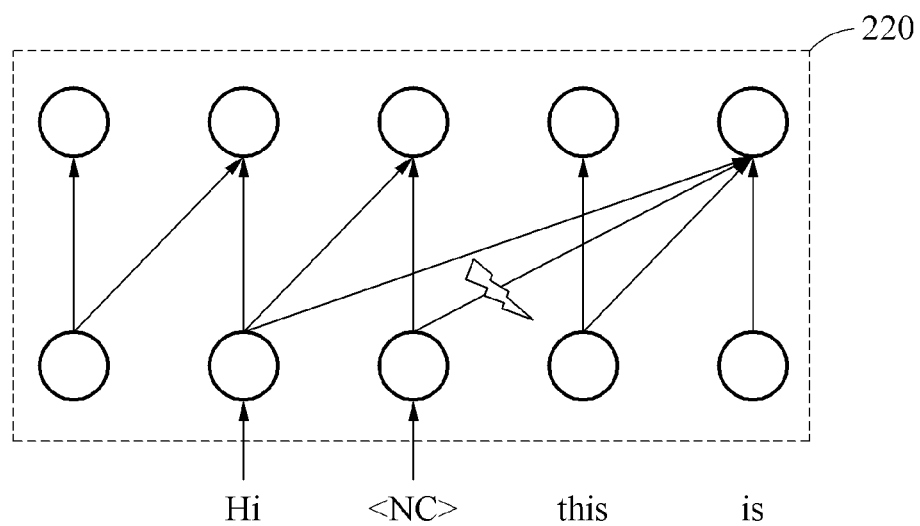
FIG. 2 illustrates an example of a method of masking a special token in an artificial neural network to which an attention mechanism is applied in accordance with one or more embodiments.

FIG. 2 is a diagram illustrating an example of a method of masking a special token in an artificial neural network to which an attention mechanism is applied.

Referring to FIG. 2, a decoder 220 predicts probabilities of candidates of an output token based on a relationship between at least one input token and the output token. The output token predicts probabilities of candidates of an output token using a weight that is selectively varied based on an input token.

For example, an artificial neural network may be an artificial neural network to which an attention mechanism is applied. The artificial neural network is trained to appropriately represent a relationship of tokens that are initially predicted based on the attention mechanism.

The decoder 220 masks a special token to prevent other tokens from attending to the special token such that the special token does not affect the other tokens.

For example, an output token corresponding to an input token "is" may attend to a special token NC in addition to the input tokens "Hi", "this", and "is". Because the special token should not affect other tokens, the special token is masked to prevent the output token corresponding to the input token "is" from attending to the special token NC.

An encoder-decoder structure artificial neural network system will be described in detail with reference to FIGS. 3 through 5.

Figure 3:
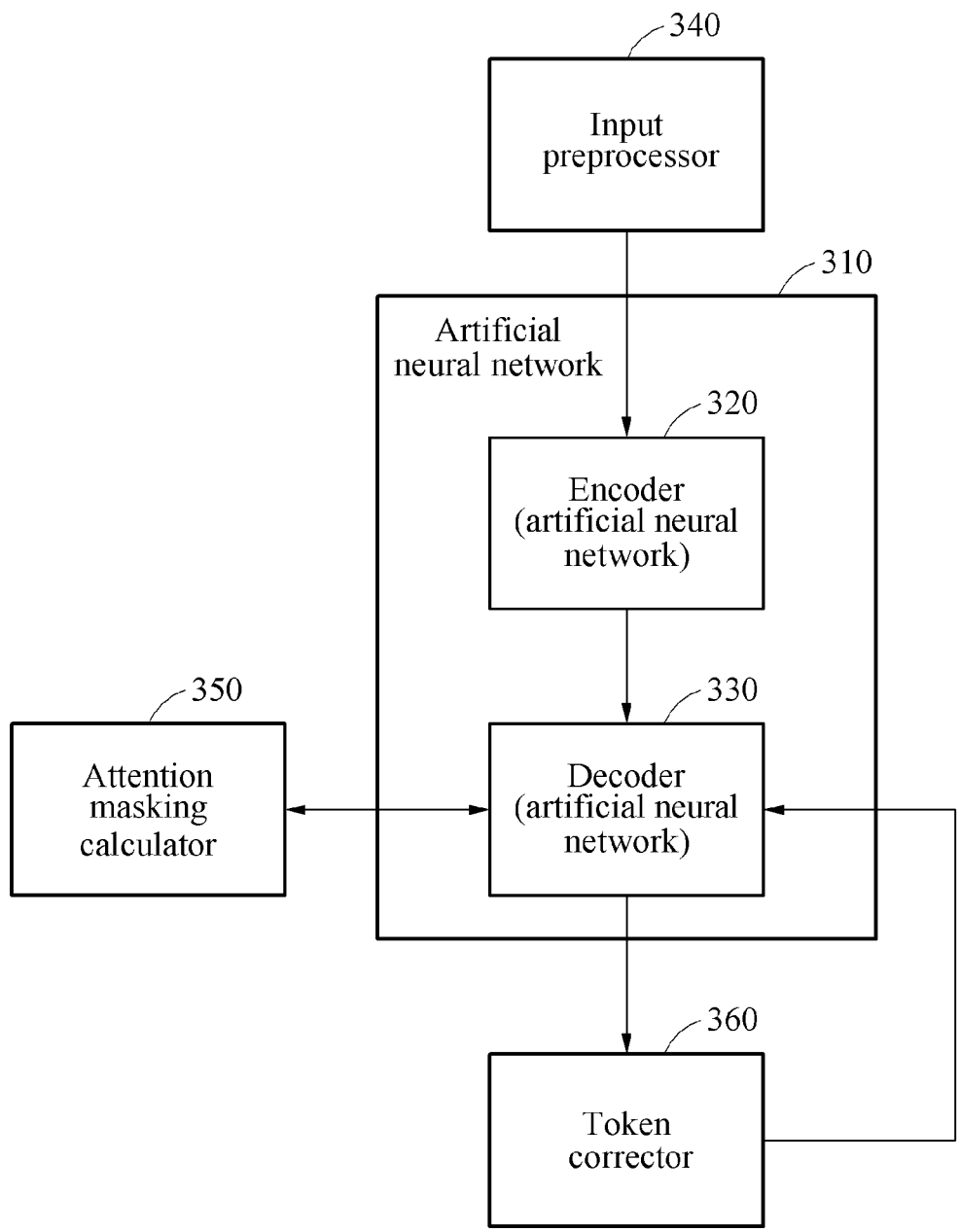
FIG. 3 illustrates an example of an encoder-decoder structure artificial neural network system, in accordance with one or more embodiments.

FIG. 3 is a block diagram illustrating an example of an encoder-decoder structure artificial neural network system.

Referring to FIG. 3, an encoder-decoder structure artificial neural network system includes an artificial neural network 310, which includes an encoder 320 and a decoder 330. The encoder-decoder structure artificial neural network system may also include an input preprocessor 340, an attention masking calculator 350, and a token corrector 360. The decoder 330 of FIG. 3 may correspond to the decoder 220 described with reference to FIGS. 1 and 2.

The encoder-decoder structure artificial neural network system processes a token having a relatively low probability in the single artificial neural network 310.

A sequence-to-sequence encoder-decoder is a network structure in which the encoder 320 and the decoder 330 are integrated and generates a sequence of recognition results from an input sequence.

The input preprocessor 340 may perform a pre-processing operation on an input of an artificial neural network. For example, the input preprocessor 340 may remove noise from an input signal or may process an input signal to be in a form suitable for input to the artificial neural network, e.g., in a form the artificial neural network is expecting based on the training of the artificial neural network.

The token corrector 360 may perform a correction operation by replacing, with a special token, an output token of which a probability is predicted to be less than a threshold probability eNC during execution so as to allow the special token be used for predicting a next input token.

Additionally, the token corrector 360 determines whether the output token is the same as the special token. When the output token is the same as the special token, a token having a second highest probability is determined as the output token. Through this, the special token is prevented from coming out as an output.

The attention masking calculator 350 masks an attention weight to prevent other tokens from attending to the special token such that the other tokens do not have a conditional probability in association with the special token. The attention masking calculator 350 may operate in the same manner during learning or training and execution.

FIG. 3 is merely explaining an example of the present disclosure, noting that additional components are intended in other examples, such as in reconstruction device examples. However, various examples with various technical modifications and variations may be applied based on the description of FIG. 3. For example, the decoder 330 may be a broad concept that includes the attention masking calculator 350 and the token corrector 360.

Figure 4:
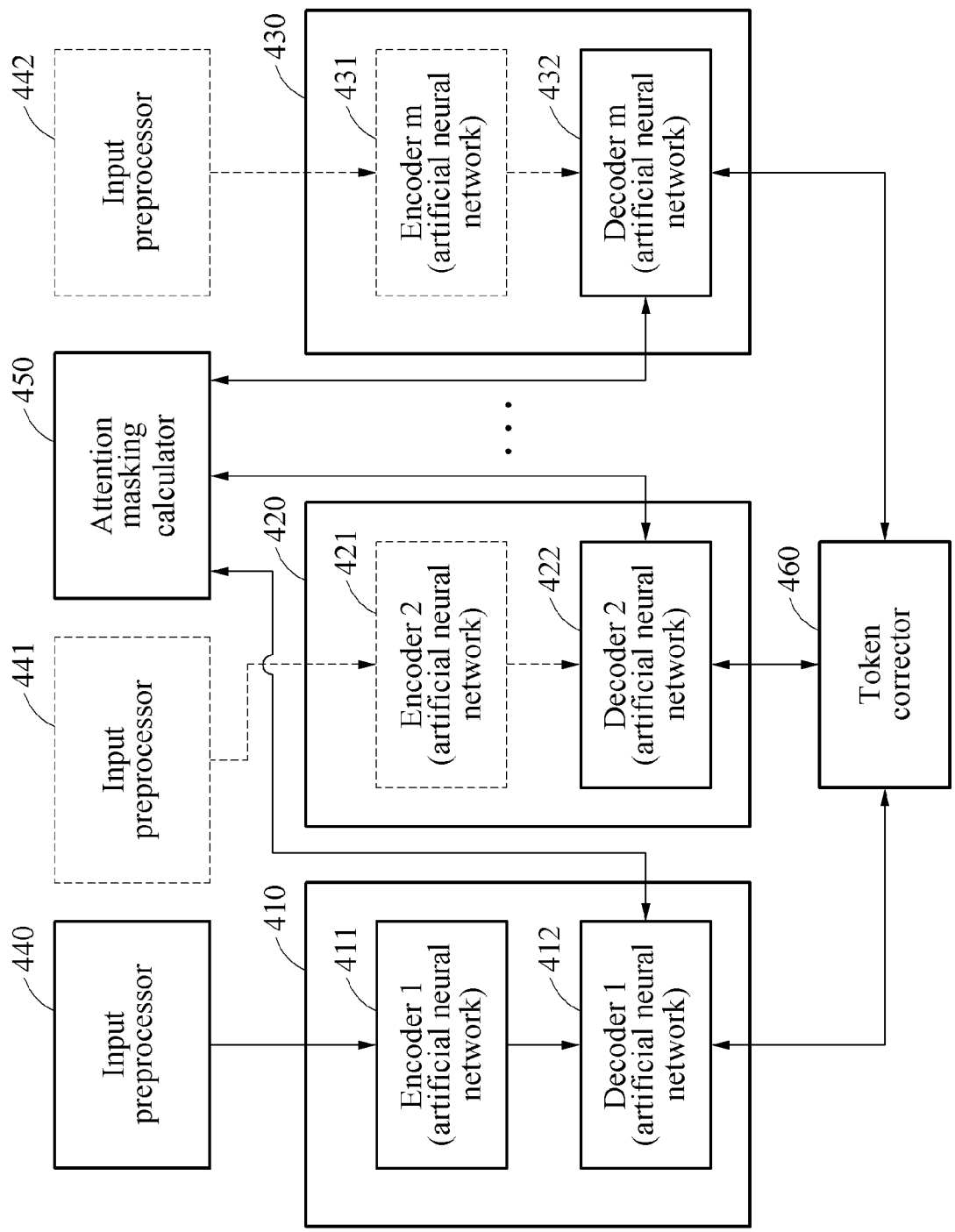
FIG. 4 illustrates an example of an encoder-decoder structure artificial neural network system based on an ensemble technique in accordance with one or more embodiments.

FIG. 4 is a block diagram illustrating an example of an encoder-decoder structure artificial neural network system using an ensemble technique.

Referring to FIG. 4, an artificial neural network system includes a plurality of artificial neural networks 410, 420, and 430.

In the encoder-decoder structure artificial neural network system using an ensemble technique, m encoders may not have to correspond to m decoders. In an example, a specific decoder may not have a corresponding encoder. For example, the artificial neural networks 420 and 430 may include respective decoders 422 and 432, but may not include respective encoders 421 and 431.

According to the ensemble technique, an output token may be selected from candidates of the output token based on a combination of probabilities of the candidates of the output token predicted by a plurality of decoders 412, 422, and 432 using the plurality of artificial neural networks 410, 420, and 430.

When the ensemble technique is used, the decoders 412, 422 and 432 may determine different output tokens to be a token having a highest probability. For example, the decoder 412 of the artificial neural network 410 may determine c1 to be a token having a highest probability, the decoder 422 of the artificial neural network 420 may determine c2 to be a token having a highest probability, and the decoder 432 of the artificial neural network 430 may determine c3 to be a token having a highest probability.

Even when each of the decoders 412, 422 and 432 determine different output tokens to be a token having a highest probability, one output token may be determined for all of the decoders. For example, an output token may be selected from candidates of the output token based on a combination of the candidates of the output token predicted by the plurality of decoders 412, 422, and 432.

When the selected output token is forcibly input as a next input token of all the decoders, an output token that is not determined to be a token having a highest probability may be input as a next input token in some of the decoders.

For example, c1 may be selected as an output token based on a combination of probabilities of candidates c1, c2, and c3 of the output token predicted by the plurality of decoders 412, 422, and 432. In this example, the decoder 422 and the decoder 423 may generate a next token based on c1 which is the candidate of the output token generated by the decoder 412 instead of generating a next output token based on the candidates c2 and c3 determined as tokens having a highest probability by the decoder 422 and the decoder 423. Due to the auto-regressive characteristic of obtaining a next token based on previous tokens, the artificial neural networks 420 and 430 using the next input token c1 having a relatively lower probability as an input in the decoders 422 and 423 thereof may not accurately predict a next output token.

The encoder-decoder structure artificial neural network system using the ensemble technique may use a special token that does not affect the conditional probability so as to normally predict an output token using, as an input, a token that is not determined as a token having the highest probability by the encoder-decoder structure artificial neural network system.

When implementing an ensemble of numerous artificial neural networks, a probability $P_j(t_{max})$ of $t_{max}$ determined as the output token for each $j^{th}$ artificial neural network is compared to a probability of the artificial neural network 410 having determined that $t_{max}$ has the highest probability. For example, among the candidates c1, c2, and c3 of the output token, a probability p2(c1) of c1 determined as the output token in the artificial neural network 420 may be compared to a probability p1(c1) of c1 in the artificial neural network 410 having determined that c1 has the highest probability.

When an output token probability difference $$\max_{1 \leq k \leq m} (P_k(t_{max})) - P_j$$

between the artificial neural network 410 having determined that the output token probability is the highest and a $j^{th}$ artificial neural network is greater than a threshold, the special token is selected to be a next input token of the $j^{th}$ artificial neural network. For example, when a difference between p1(c1) and p2(c1) is greater than a threshold $\theta_{DIFF}$, the special token may be selected to be the next input token of the artificial neural network 420 instead of c1. When the output token probability difference between the artificial neural network 410 having determined that the output token probability is the highest and the $j^{th}$ artificial neural network is less than the threshold, the determined output token may be selected to be the next input token of the $j^{th}$ artificial neural network.

When the output token probability difference $$\max_{1 \leq k \leq m} (P_k(t_{max})) - P_j$$

between the artificial neural network having determined that the output token probability is the highest and the $j^{th}$ artificial neural network is greater than the threshold, a reliability of candidates of a next output token predicted based on the special token is higher than a reliability of candidates of a next output token predicted based on the output token.

The description of the method of masking the special token in the example of FIG. 2 may also be applied to the encoder-decoder structure artificial neural network system using the ensemble technique of FIG. 4, for example.

A token corrector 460 performs correction by replacing, with a special token, an output token of which a probability is predicted to be less than a threshold probability $\theta_{NC}$ during execution so that the special token may be used to predict a next input token.

During the execution, the token corrector 460 selects the special token as a next input token of a $j^{th}$ artificial neural network when the output token probability difference $$\max_{1 \leq k \leq m} (P_k(t_{max})) - P_j$$

between the artificial neural network having determined that the output token probability is the highest and the $j^{th}$ artificial neural network is greater than the threshold.

Additionally, the token corrector 460 determines whether the output token is the same as the special token. When the output token is the same as the special token, a token having a second highest probability is determined as the output token. Accordingly, the special token may be prevented from coming out, or provided as an output.

An attention masking calculator 450 masks an attention weight to prevent other tokens from attending to the special token such that the other tokens do not have a conditional probability in association with the special token. The attention masking calculator 450 may operate in the same manner during learning as well as during execution, inference, or implementation.

Figure 5:
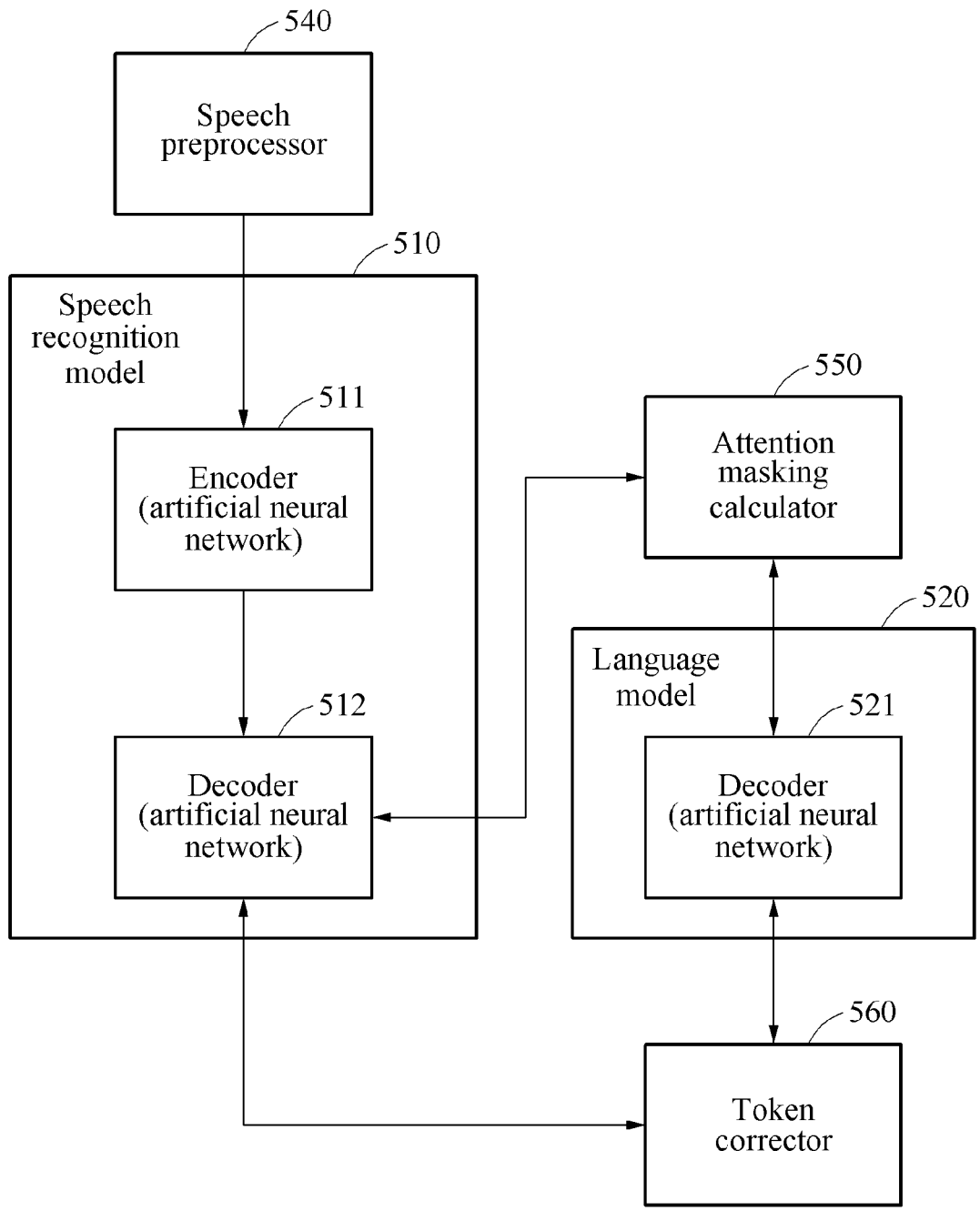
FIG. 5 illustrates an example of an application in a speech recognition artificial neural network having an additional language model in accordance with one or more embodiments.

FIG. 5 is a block diagram illustrating an example of a speech recognition artificial neural network having an additional language model artificial neural network. The speech recognition artificial neural network may be implemented in an example, as a speech recognition apparatus. The speech recognition apparatus may collect sound or an input from a user using a receiver or sensor (e.g., a microphone) that is a component of the speech recognition apparatus, or may receive the speech signal from the receiver, wherein the receiver is separate or external to the speech recognition apparatus.

The speech recognition apparatus may be an electronic device used by individual users and may be or include, for example, a smart phone, a smart pad, a wearable device such as a smart band, a personal digital assistant (PDA), a laptop, an internal component thereof, or a standalone apparatus in connection thereto. In another example, the speech recognition apparatus is an electronic device shared by a plurality of users and includes, for example, a speech recognition speaker and a speech recognition TV.

Referring to FIG. 5, a speech recognition artificial neural network, including a language model artificial neural network, includes a speech recognition model artificial neural network 510 and a language model artificial neural network 520.

In an example of speech recognition, i.e., machine speech recognition, a decoder 512 may output a sequence of words corresponding to a recognition result using speech or a speech signal as an input of an encoder 511. Additionally, the language model artificial neural network 520 may include a decoder 521 which determines a probability of the sequence of words in a general sentence. The language model artificial neural network 520 may be used to improve a performance.

A speech recognition model artificial neural network, which predicts or estimates a word based on an actual speech at every point in time, may produce a word by listening to the speech and combining phonemes according to a pronunciation even if the word is a new word. However, in an example of a language model artificial neural network that has been trained using general sentences, an output probability of the word may be very low when the word is a new word (for example, a new place, a newly created word, and the like). When trying to predict a next word using a word having such a low probability as an input, the language model artificial neural network may not make a correct prediction because the next word is to be output from an input that has not been learned.

A token corrector 560 and an attention masking calculator 550 may be used to introduce a special token that does not affect the conditional probability described with reference to FIG. 4 to the language model artificial neural network 520. Accordingly, the language model artificial neural network 520 may normally predict an output token using a token that is not determined as a token having a highest probability by the language model artificial neural network 520 as an input.

The speech signal that is input to the encoder 511 may refer to an analog wave form captured or input to the speech recognition apparatus, that is then converted into a digital waveform, and may include the aforementioned noise reduction, and in some examples, then converted into feature data for the digital waveform prior to being acted on or applied/provided to the speech recognition model 510, and/or may refer to such feature data in the example speech sequence format that is acted on or applied/provided to the speech recognition model 510. Thus, for ease of description and not to limit examples thereto, hereinafter for the Specification the speech signal term will be discussed as corresponding to such post-collection processing having been performed on captured audio to ultimately generate the example feature data in the example speech sequence form, for application/provision/input to the speech recognition model, i.e., in the form the speech recognition model expects such application/provision/input of information. As noted above, the speech recognition apparatus may perform all such post-collection processing of the captured speech and itself implement the speech recognition model 510, or the speech recognition apparatus may perform none, some, or all such post-collection processing of the captured speech, while a speech recognition server (as another speech recognition apparatus example) may then perform any remaining post-collection processing for the captured speech to generate corresponding speech information in the form expected by the speech recognition model 510, and implement the speech recognition model 510, e.g., by way of the speech recognition apparatus.

An example in a speech recognition artificial neural network having an additional language model artificial neural network will be described in detail with reference to FIGS. 6 through 7B.

Figure 6:
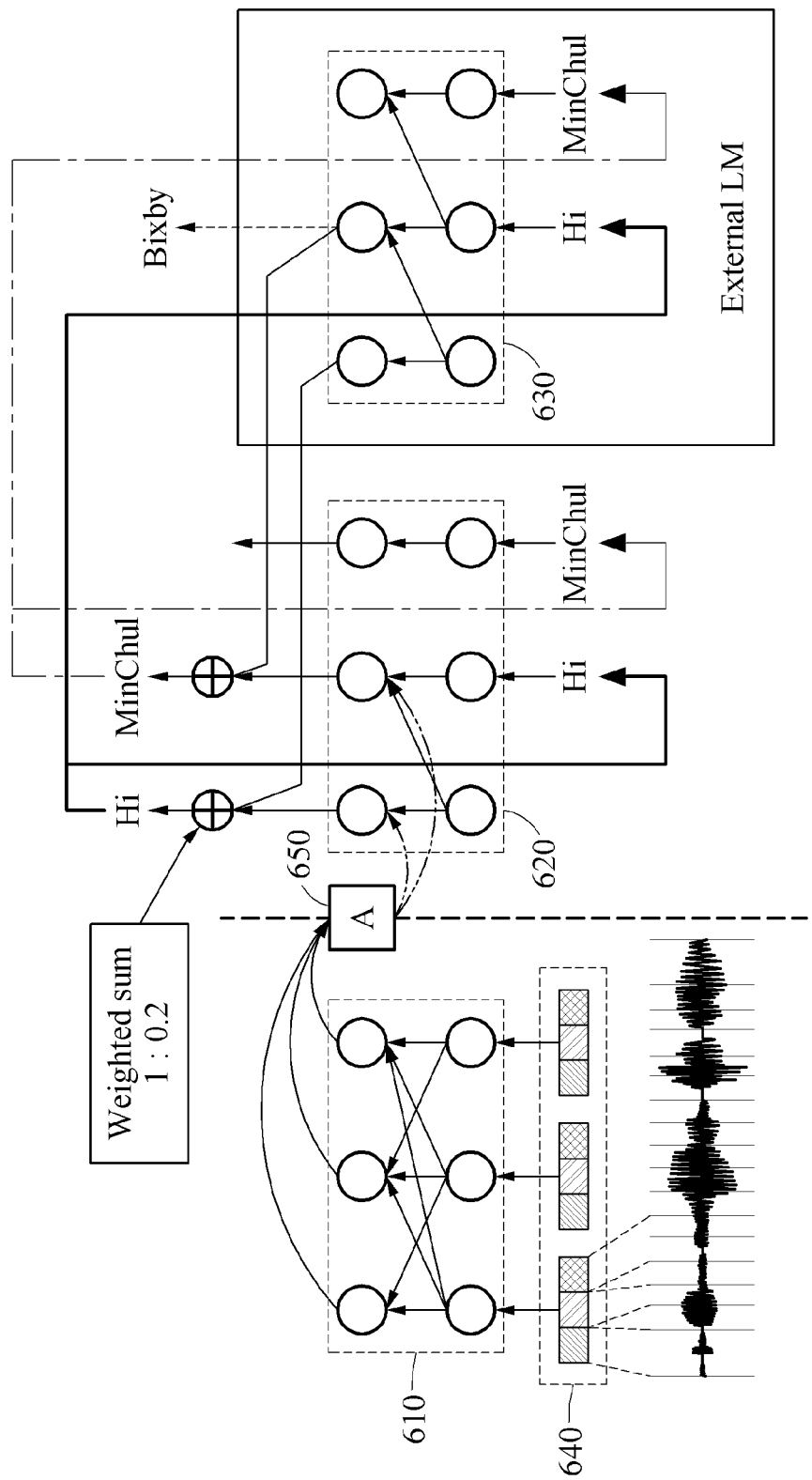
FIG. 6 illustrates an example of a speech recognition artificial neural network system having an additional language model artificial neural network in accordance with one or more embodiments.

FIG. 6 is a diagram illustrating an example of a speech recognition artificial neural network system which includes an additional language model artificial neural network.

Referring to FIG. 6, a speech recognition artificial neural network system including an additional language model artificial neural network includes an encoder 610, a speech recognition artificial neural network decoder 620, and a language model artificial neural network decoder 630.

The speech recognition artificial neural network system including an additional language model artificial neural network may extract a speech feature 640 from an input speech. The input speech is a speech signal including information for each of a plurality of frames. The speech feature 640 is a sequence of information extracted in units of at least one frame and represented by a multidimensional vector. Hereinafter, an example in which the input speech is "Hi MinChul this is" will be described for ease of description.

The speech recognition artificial neural network system including an additional language model artificial neural network may generate a recognition result sequence from an input speech sequence using an ensemble of the language model artificial neural network decoder 630 and the speech recognition artificial neural network decoder 620. "Ensemble" may refer to the individual neural network modules taken or considered together. For example, the combination of the language model artificial neural network decoder 630 and the speech recognition artificial neural network decoder 620.

The language model artificial neural network decoder 630 and the speech recognition artificial neural network decoder 620 output recognition results in units of tokens, and generate a final recognition result by ensembling the recognition results based on an ensemble weight.

For example, the speech recognition artificial neural network decoder 620 determines candidates of an output token based on the input speech and a recognition result determined in advance. Also, the language model artificial neural network decoder 630 determines candidates of an output token based on a recognition result determined in advance. In this example, the candidates of each of the output tokens may be ensembled based on an ensemble weight, so that a final recognition result is generated.

The encoder 610 and the decoder 620 are previously trained to generate a recognition result sequence from a sequence of correct answer text pairs corresponding to the input speech. Also, the language model artificial neural network decoder 630 is previously trained to generate a recognition result sequence from a predetermined text sequence.

In an example, encoder 610 encodes the speech feature 640 to generate an encoded feature 650. The encoder 610 generates encoded information by changing a dimension of the speech feature 640. The encoded feature 650 is applied to the speech recognition artificial neural network decoder 620. The speech recognition artificial neural network decoder 620 generates candidates of an output token based on the encoded feature 650 and the previously determined recognition result in units of tokens. Also, the language model artificial neural network decoder 630 generates candidates of an output token based on the previously determined recognition result in units of tokens. The two recognition results are ensembled based on a predetermined ensemble weight, so that a final recognition result is generated. For example, an ensemble weight of the speech recognition artificial neural network decoder 620 and the language model artificial neural network decoder 630 may be 1:0.2.

An example of an application of an ensemble technique in a language model artificial neural network decoder and a speech recognition artificial neural network decoder will be described in detail with reference to FIGS. 7A and 7B.

Figure 7A:
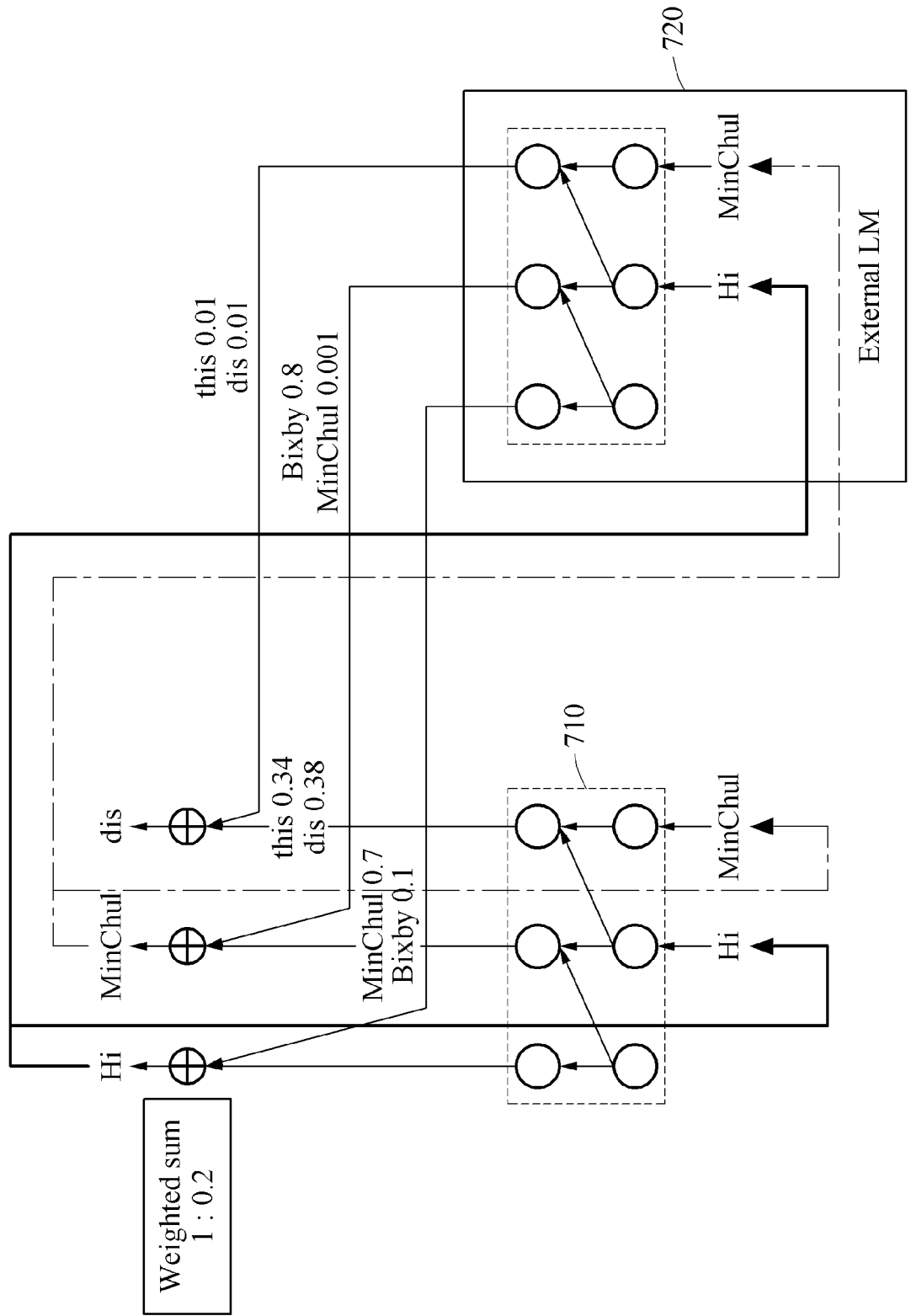
FIG. 7A illustrates an example of applying an ensemble technique to a language model artificial neural network decoder and a speech recognition artificial neural network decoder in accordance with one or more embodiments.

FIG. 7A is a diagram illustrating an example of an application of an ensemble technique in a language model artificial neural network decoder and a speech recognition artificial neural network decoder.

Referring to FIG. 7A, a speech recognition artificial neural network decoder 710 and a language model artificial neural network decoder 720 may respectively correspond to the speech recognition artificial neural network decoder 620 and the language model artificial neural network decoder 630 of FIG. 6, as a non-limiting example.

The speech recognition artificial neural network decoder 710 and the language model artificial neural network decoder 720 may each be an auto-regressive decoder and predict probabilities of candidates of an output token based on an input token "Hi". For example, the speech recognition artificial neural network decoder 710 outputs "MinChul" and "Bixby" as candidates of an output token based on the input token "Hi" and an encoded speech feature and predicts probabilities of the candidates to be 0.7 and 0.1, respectively. Also, the language model artificial neural network decoder 720 outputs "MinChul" and "Bixby" as candidates of an output token based on the input token "Hi" and predicts probabilities of the candidates to be 0.001 and 0.8, respectively.

The speech recognition artificial neural network decoder 710 and the language model artificial neural network decoder 720 determines an output token among the candidates based on an ensemble weight. For example, "MinChul" has a final weight of 0.7002 (=0.7+0.2*0.001) and "Bixby" has a final weight of 0.26 (=0.1+0.2*0.8). In this example, "MinChul" is determined to be the output token.

In an auto-regressive decoding environment, the language model artificial neural network decoder 720 inputs "MinChul" as a next input token determined as an ensemble result instead of "Bixby" which is determined by the language model artificial neural network decoder 720 as a token having a highest probability. Because "MinChul" is determined to have a lower probability by the language model artificial neural network decoder 720, it may be difficult to accurately predict a next output token in the language model artificial neural network decoder 720.

For example, the language model artificial neural network decoder 720 outputs "this" and "dis" as candidates of a next output token based on the next input token "MinChul" and predicts probabilities of the candidates to be 0.01 and 0.01, respectively. The speech recognition artificial neural network decoder 710 outputs "this" and "dis" as candidates of a next output token based on the next input token "MinChul" and predicts probabilities of the candidates "this" and "dis" to be 0.34 and 0.38, respectively. Because pronunciations of "this" and "dis" are similar, the probabilities of "this" and "dis" may be similar in the speech recognition artificial neural network decoder 710.

The speech recognition artificial neural network decoder 710 and the language model artificial neural network decoder 720 determine a next output token among the candidates based on an ensemble weight. For example, "this" has a final weight of 0.342 (=0.34+0.2*0.01) and "dis" has a final weight of 0.382 (=0.38+0.2*0.01). Thus, "dis" is determined to be the next output token. As such, the speech recognition artificial neural network decoder 710 and the language model artificial neural network decoder 720 may output "dis", which is different from the input speech "this".

In the foregoing example, the probability of "MinChul" determined by an ensemble of the speech recognition artificial neural network decoder 710 and the language model artificial neural network decoder 720 among candidates of a current output token predicted by the language model artificial neural network decoder 720 may be lower than a threshold probability. Due to the lower probability of "MinChul", the language model artificial neural network decoder 720 may not accurately distinguish between "this" and "dis" as the next output token. As a performance of the language model artificial neural network decoder 720 which complements a performance of the speech recognition artificial neural network decoder 710 is degraded, an incorrect result may be obtained, such as outputting "this" which is different from "dis" as described above.

An example of an application of an ensemble technique in a language model artificial neural network decoder and a speech recognition artificial neural network decoder using a special token will be further described with reference to FIG. 7B.

Figure 7B:
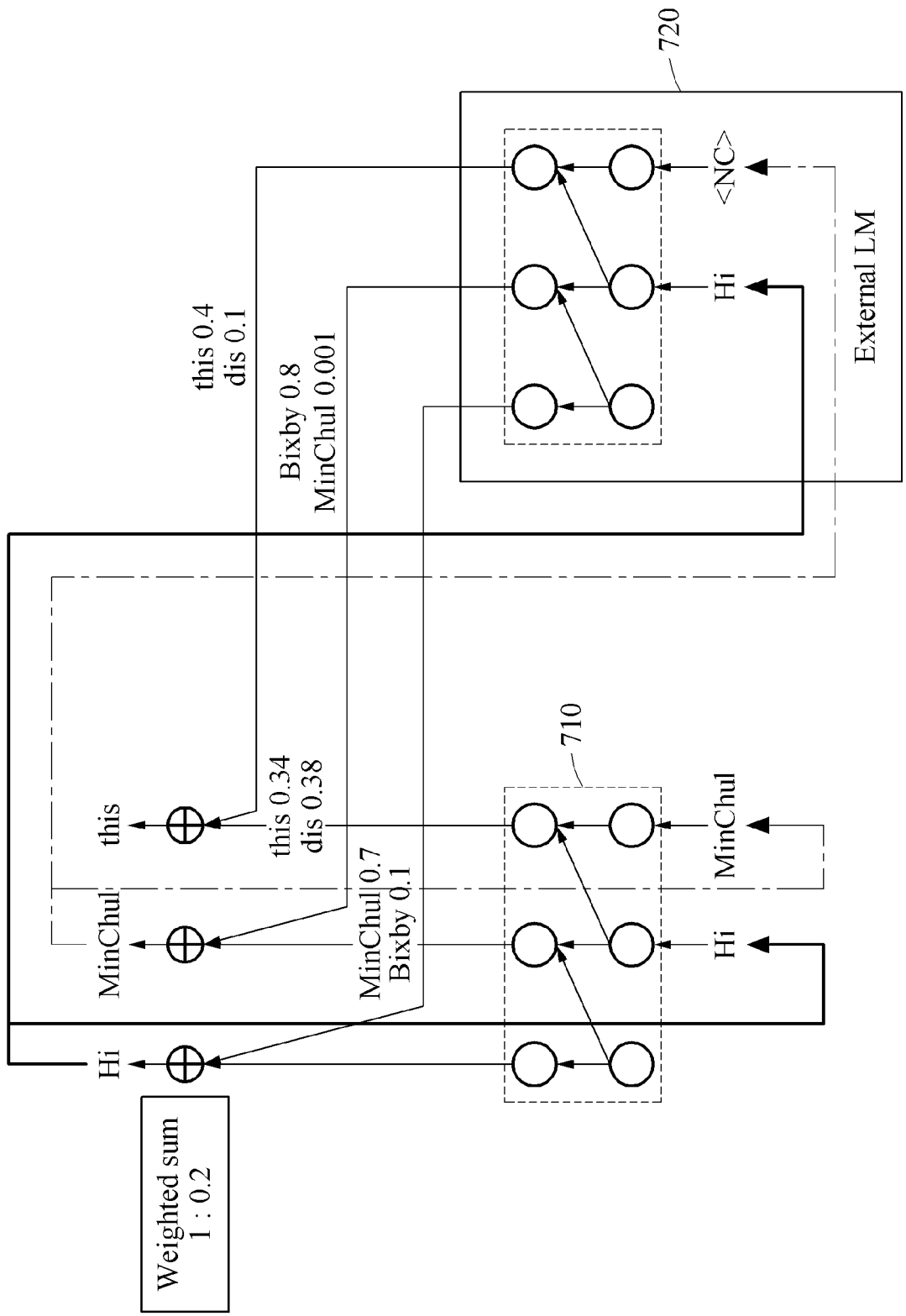
FIG. 7B illustrates an example of applying an ensemble technique to a speech recognition artificial neural network decoder and to a language model artificial neural network decoder using a special token in accordance with one or more embodiments.

FIG. 7B is a diagram illustrating an example of an application of an ensemble technique in a language model artificial neural network decoder and a speech recognition artificial neural network decoder based on the implementation of a special token.

Referring to FIG. 7B, the speech recognition artificial neural network decoder 710 and the language model artificial neural network decoder 720 determine "MinChul" among candidates to be an output token using an ensemble weight.

The language model artificial neural network decoder 720 compares a probability of "MinChul" and a threshold probability determined in advance. The threshold probability is, for example, 0.01. As illustrated in FIG. 7B, the probability of "MinChul" predicted by the language model artificial neural network decoder 720 is 0.001, which is less than the threshold probability of 0.01. Thus, the language model artificial neural network decoder 720 selects a special token NC as a next input token instead of "MinChul".

The language model artificial neural network decoder 720 outputs "this" and "dis" as candidates of a next output token based on the special token NC corresponding to the next input token and predicts probabilities of the candidates "this" and "dis" to be 0.4 and 0.1, respectively. The speech recognition artificial neural network decoder 710 outputs "this" and "dis" as candidates of a next output token based on the special token NC corresponding to the next input token and predicts probabilities of the candidates "this" and "dis" to be 0.34 and 0.38, respectively.

The speech recognition artificial neural network decoder 710 and the language model artificial neural network decoder 720 determine a next output token among the candidates using an ensemble weight. For example, "this" has a final weight of 0.42 (=0.34+0.2*0.4) and "dis" has a final weight of 0.4 (=0.38+0.2*0.1). Thus, "this" is determined to be the next output token.

Figure 8:
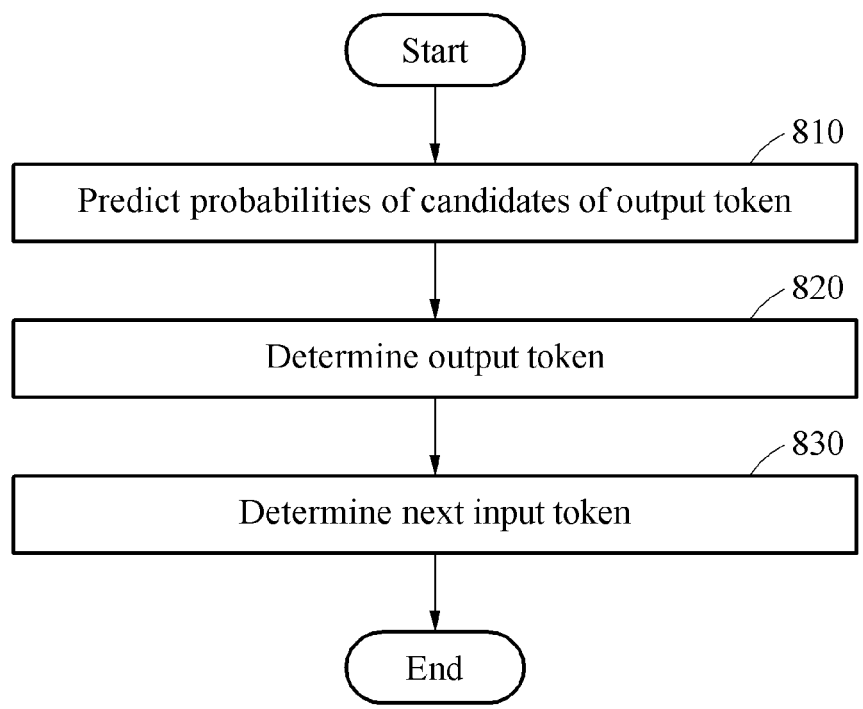
FIG. 8 illustrates an example of a decoding method in an artificial neural network in accordance with one or more embodiments.

FIG. 8 is a flowchart illustrating an example of a decoding method in an artificial neural network. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, operations 810 through 830 may be performed by the decoder 330 of FIG. 3. The decoder 330 may be implemented by one or more hardware components or one or more components including both hardware and software.

In operation 810, the decoder 330 predicts probabilities of candidates of an output token based on at least one input token that was initially input.

In operation 820, the decoder 330 determines an output token from the candidates based on the determined probabilities. For example, the decoder 330 may select a token with a highest probability from the candidates. Also, the decoder 330 may also select the output token based on a combination of probabilities of candidates predicted by a second artificial neural network interworking with the first artificial neural network and the probabilities of the candidates predicted by the first artificial neural network.

In operation 830, the decoder 330 determines a next input token by selecting one of the output token and a pre-defined special token based on the determined probability of the output token.

The at least one input token includes at least one of a special token and an output token previously predicted by the artificial neural network.

An input layer of the artificial neural network may include a plurality of nodes corresponding to the candidates and a special node corresponding to the special token.

Figure 9:
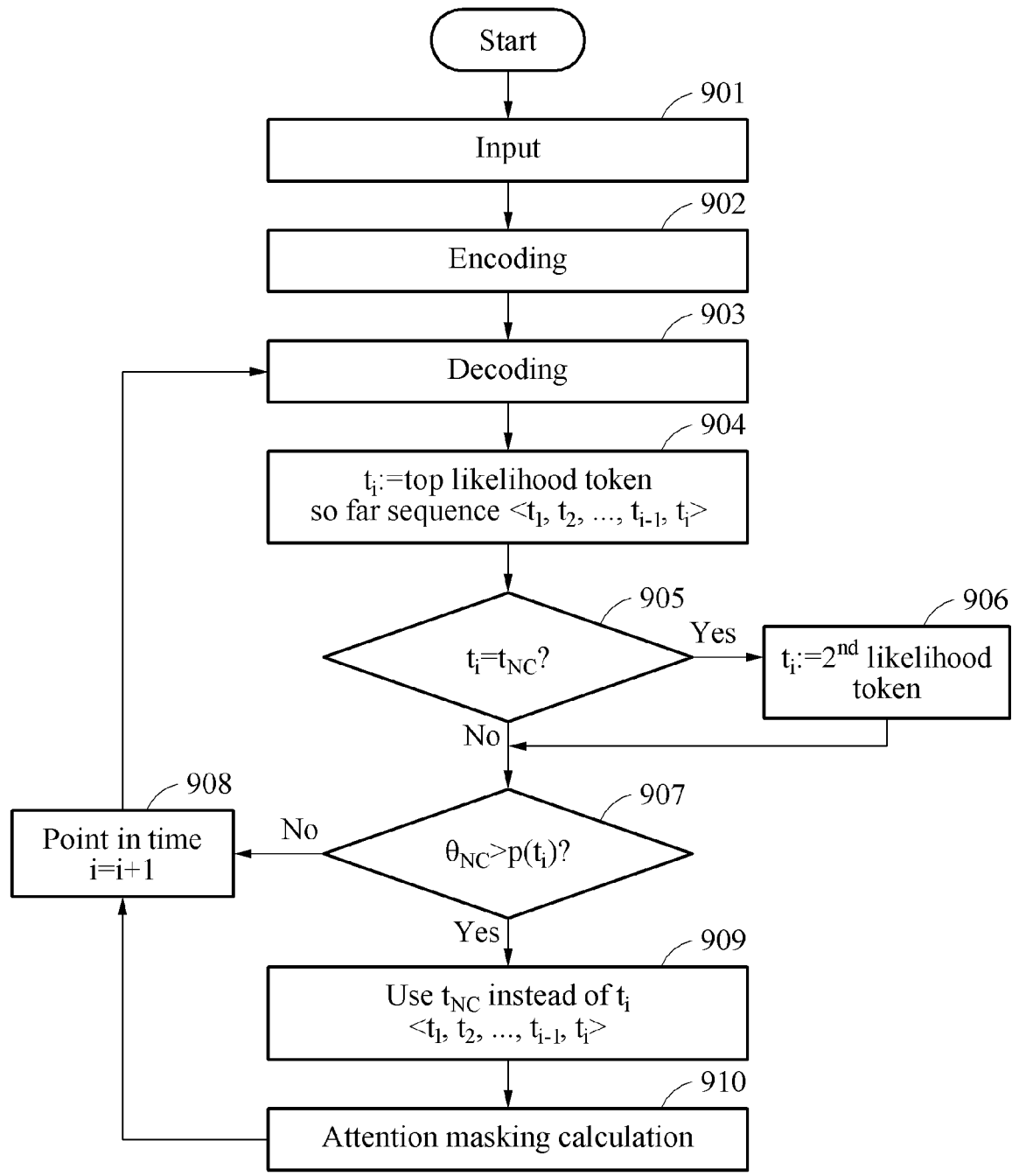
FIG. 9 illustrates an example of a method of processing a token with a low probability in an auto-regressive-based sequence generating artificial neural network in accordance with one or more embodiments.

FIG. 9 is a flowchart illustrating an example of a method of processing a token with a low probability in an auto-regressive-based sequence generating artificial neural network. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, in operation 901, an auto-regressive-based sequence generating artificial neural network receives an input. For example, a speech recognition artificial neural network system may receive a speech input.

In operation 902, an encoder generates an encoded feature from the received input. For example, the encoder may generate encoded information by changing a dimension of a speech feature.

In operation 903, a decoder predicts probabilities of candidates of an output token based on the encoded feature. The decoder obtains the output token based on information calculated by the encoder for each step. In this example, the decoder obtains the output token depending on input tokens selected up to a previous step.

In operation 904, the decoder determines the output token from candidates based on the predicted probabilities. For example, the decoder determines $t_i$ having a highest probability at an $i^{th}$ step to be the output token.

In operation 905, the decoder determines whether the output token is the same as a special token.

In operation 906, when the output token is the same as the special token, the decoder determines a token having a second highest probability among the candidates to be the output token. Through this, the special token is prevented from being output.

In operation 907, when the output token is different from the special token, the decoder compares a probability of the output token to a threshold probability.

In operation 908, when the probability of the output token is higher than the threshold probability, the decoder selects the output token to be a next input token.

In operation 909, when the probability of the output token is less than the threshold probability, the decoder selects the special token as the next input token instead of the output token.

In operation 910, the decoder masks the special token to prevent other tokens from attending to the special token such that the special token does not affect the other tokens.

A special token $t_{NC}$ that does not affect a conditional probability is introduced such that $t_i$ which is an output token is adequately, e.g., within a predetermined accuracy, predicted even when a probability of an input token $t_{i-1}$ is low. The special token is learned to have characteristics as shown in Equation 2 below.

$$p(t_i|<T_1>, t_{NC}, <T_2>, H_e)=p(t_i|<T_1>, <T_2>, H_e) \text{ for any } t_i \quad (2)$$

In Equation 2, $<T_1>$, $<T_2>$ is any token sequence and includes an empty sequence. When $t_{NC}$ is learned according to Equation 2, $t_{i-1}$ is replaced with $t_{NC}$ to prevent a conditional probability including the token $t_{i-1}$ from being calculated if a probability of $t_{i-1}$ is less than a threshold $\theta_{NC}$, so that a next token is correctly predicted. An artificial neural network is trained by changing tokens of a correct answer sentence used for learning at a predetermined probability to $t_{NC}$ at a probability $\theta_{Replace}$.

When main and auxiliary artificial neural networks are distinguished, the training may be performed by changing a correct answer token at the probability $\theta_{Replace}$ in learning data of an auxiliary artificial neural network. For example, in a case of a speech recognition artificial neural network system having an additional language model artificial neural network, the language model artificial neural network may be the auxiliary artificial neural network. In this example, the training is performed by changing a correct answer token at the probability $\theta_{Replace}$ in learning data of the language model artificial neural network.

Figure 10:
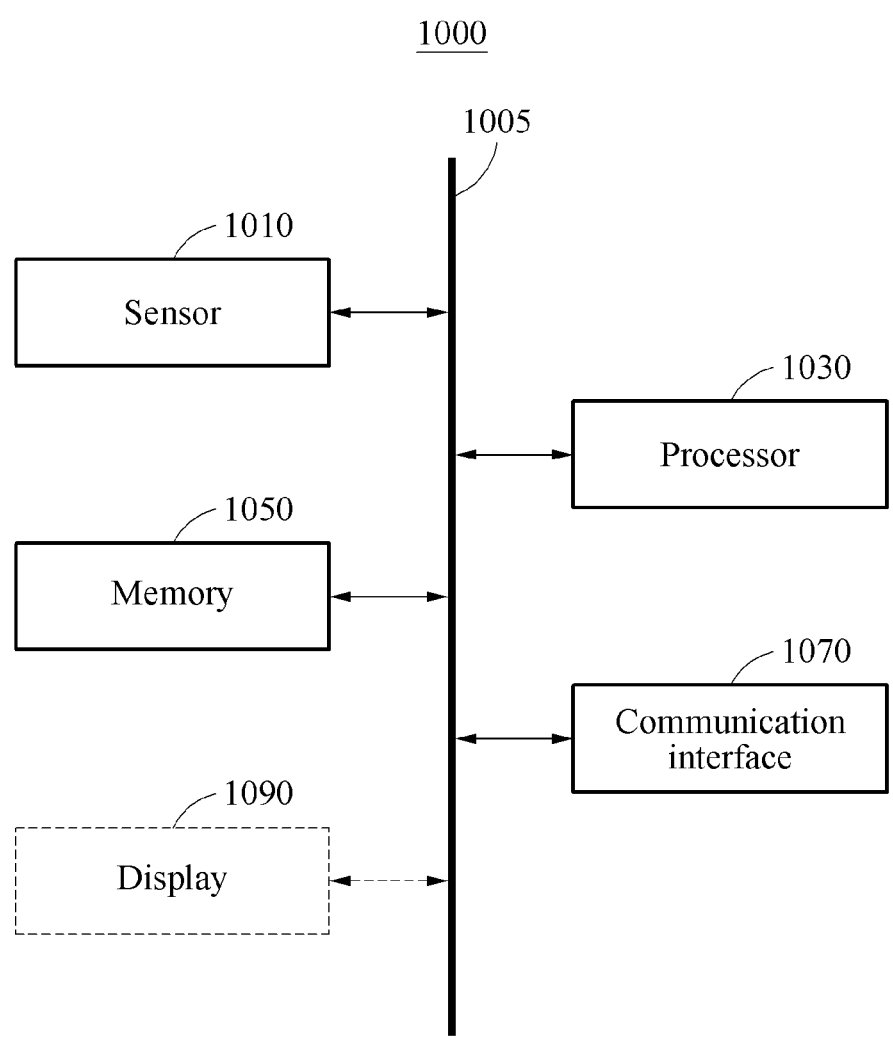
FIG. 10 illustrates an example of an apparatus processing a token with a low probability in an auto-regressive-based sequence generating artificial neural network.

FIG. 10 is a block diagram illustrating an apparatus for processing a token with a low probability in an auto-regressive-based sequence generating artificial neural network.

Referring to FIG. 10, an apparatus 1000 for processing a token with a low probability in an auto-regressive-based sequence generating artificial neural network includes one or more sensors 1010, a processor 1030, and a communication interface 1070. The apparatus 1000 further includes a memory 1050 and a display 1090. The one or more sensors 1010, the processor 1030, the memory 1050, the communication interface 1070, and the display 1090 may communicate with each other through a communication bus 1005.

The one or more sensors 1010 include, for example, a microphone sensor and a voice sensor, but are not so limited.

The processor 1030 performs any one, any combination, or all operations or methods described with reference to FIGS. 1 through 9, or an algorithm corresponding to the at least one method. The processor 1030 executes a program and controls the apparatus 1000. The computer instructions or code executed by the processor 1030 are stored in the memory 1050.

The processor 1030 includes, for example, a central processing unit (CPU) or a graphics processing unit (GPU).

The memory 1050 stores data processed by the processor 1030. For example, the memory 1050 stores a program. The memory 1050 may be a volatile memory or a non-volatile memory.

The communication interface 1070 is connected to the sensor(s) 1010, the processor 1030, and the memory 1050 to perform data transmission and reception. The communication interface 1070 is connected to an external device to perform data transmission and reception. In the following description, an expression "transmitting and receiving "A"" refers to transmitting and receiving data or information representing "A".

The communication interface 1070 is implemented as, for example, a circuitry in the apparatus 1000. In an example, the communication interface 1070 may include an internal bus and an external bus. In another example, the communication interface 1070 may be an element configured to connect the apparatus 1000 to an external device. The communication interface 1070 receives data from the external device and transmits the data to the processor 1030 and the memory 1050.

The display 1090 displays a decoding result. For example, a translation result and a speech recognition result may be displayed on the display 1090.

The apparatuses, input preprocessor 340/440/441/442, attention masking calculator 350/450/550, encoder 320/411/421/431/511, decoder 330/412/422/432/512/521, token corrector 360/460/560, speech preprocessor 540, sensor, 1010, memory 1050, processor 1030, display 1090, communication interface 1070, components, devices, and other components described herein with respect to FIGS. 1-10 are, and are implemented by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated and discussed with respect to FIGS. 1-10, and that perform the operations described in this application, are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, as non-limiting blue-ray or optical disk storage examples, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented decoding method in a first neural network, the decoding method comprising:
   predicting probabilities of candidates of an output token based on at least one previously input token;
   determining the output token among the candidates based on the predicted probabilities;
   determining a next input token by selecting one of the output token and a pre-defined special token based on a determined probability of the output token; and
   setting a relationship between the next output token and the special token to be less than or equal to a predetermined value when the special token is determined to be the next input token.

2. The method of claim 1, wherein when the special token is determined to be the next input token, a reliability of candidates of a next output token predicted based on the special token is higher than a reliability of candidates of a next output token predicted based on the output token.

3. The method of claim 2, wherein the determining of the output token comprises:
   selecting the output token from the candidates based on a combination of probabilities of the candidates predicted by one or more second neural networks interworking with the first artificial neural network, and probabilities of the candidates predicted by the first neural network.

4. The method of claim 1, wherein an input layer of the neural network comprises a plurality of nodes corresponding to each of the candidates, and a special node corresponding to the special token.

5. The method of claim 1, wherein the at least one previously input token comprises at least one of an output token previously predicted by the neural network and the special token.

6. The method of claim 1, wherein the determining of the output token comprises:
   selecting a token having a highest probability among the candidates.

7. The method of claim 3, wherein the method is a recognition method using the first and the one or more second neural networks.

8. The method of claim 1, wherein the determining of the next input token comprises:
   comparing a probability of the output token to a threshold probability;
   selecting the special token as the next input token when the probability of the output token is lower than the threshold probability; and
   selecting the output token as the next input token when the probability of the output token is higher than or equal to the threshold probability.

9. The method of claim 1, wherein the predicting of the probabilities of the candidates of the output token comprises:
   predicting probabilities of the candidates of the output token based on a relationship between the at least one previously input token and the output token.

10. The method of claim 1, further comprising:
    determining a next output token based on the at least one previously input token and the next input token.

11. The method of claim 2, further comprising:
    masking the special token to prevent tokens other than the special token from attending to the special token.

12. The method of claim 1, wherein the determining of the output token comprises:
    determining whether the output token is similar to the special token; and
    determining a token having a second highest probability among the candidates to be the output token when the output token is similar to the special token.

13. A processor-implemented decoding method in a first neural network, the method comprising:
    predicting probabilities of candidates of an output token based on at least one previously input token;
    selecting the output token from the candidates based on a combination of probabilities of candidates predicted by one or more second neural networks interworking with the first neural network and probabilities of candidates predicted by the first neural network;

comparing a probability of the output token in the first neural network and a probability of the output token in a determined neural network among the one or more second neural networks which has a highest probability of the output token; and determining a next input token in the first neural network by selecting one of the output token and a pre-defined special token based on a result of the comparing.

14. The method of claim 13, wherein the determining of the next input token comprises:

selecting the special token to be the next input token of the first neural network when a difference between the probability of the output token in the first neural network and the probability of the output token in the determined neural network is greater than or equal to a threshold value; and selecting the output token to be the next input token of the first neural network when a difference between the probability of the output token in the first neural network and the probability of the output token in the determined neural network is less than the threshold value.

15. The method of claim 14, wherein when the difference between the probability of the output token in the first neural network and the probability of the output token in the determined neural network is greater than or equal to the threshold value, a reliability of candidates of a next output token predicted based on the special token is higher than a reliability of candidates of a next output token predicted by the output token.

16. The method of claim 13, wherein an input layer of the neural network comprises a plurality of nodes corresponding to each of the candidates, and a special node corresponding to the special token.

17. The method of claim 13, wherein the at least one previously input token comprises at least one of an output token previously predicted by the artificial neural network and the special token.

18. The method of claim 13, wherein the predicting of the probabilities of the candidates of the output token comprises:

predicting probabilities of the candidates of the output token based on a relationship between the at least one previously input token and the output token.

19. The method of claim 13, further comprising:
determining a next output token based on the at least one previously input token and the next input token.

20. The method of claim 13, further comprising:
masking the special token to prevent tokens other than the special token from attending to the special token.

21. The method of claim 13, further comprising:
setting a relationship between the next output token and the special token to be less than or equal to a predetermined value when the special token is determined to be the next input token.

22. The method of claim 13, wherein the determining of the output token comprises:

determining whether the output token is similar to the special token; and determining a token having a second highest probability among the candidates to be the output token when the output token is similar to the special token.

23. A non-transitory computer-readable storage medium storing instructions that, when executed by a processor, cause the processor to perform the method of claim 1.

24. A speech recognition apparatus comprising:
one or more processors configured to implement at least a first neural network including the one or more processors configured to:

predict probabilities of candidates of an output token based on at least one previously input token input;

determine the output token among the candidates based on the predicted probabilities; and determine a next input token by selecting one of the output token and a pre-defined special token based on a determined probability of the output token, wherein the one or more processors are further configured to mask the special token to prevent tokens other than the special token from attending to the special token.

25. The speech recognition apparatus of claim 24, wherein when the special token is determined to be the next input token, a reliability of candidates of a next output token predicted based on the special token is higher than a reliability of candidates of a next output token predicted based on the output token.

26. The speech recognition apparatus of claim 24, wherein an input layer of the neural network comprises a plurality of nodes corresponding to each of the candidates, and a special node corresponding to the special token.

27. The speech recognition apparatus of claim 24, wherein the at least one previously input token comprises at least one of an output token previously predicted by the neural network and the special token.

28. The speech recognition apparatus of claim 24, wherein the one or more processors are configured to select a token having a highest probability among the candidates.

29. The speech recognition apparatus of claim 24, wherein the one or more processors are further configured to implement one or more second neural networks, and wherein the one or more processors are further configured to select the output token from the candidates based on a combination of probabilities of the candidates predicted by a second neural network interworking with the first neural network, and probabilities of the candidates predicted by the first neural network.

30. The speech recognition apparatus of claim 24, wherein the one or more processors are further configured to:

compare a probability of the output token to a threshold probability;

select the special token as the next input token when the probability of the output token is lower than the threshold probability; and select the output token as the next input token when the probability of the output token is higher than or equal to the threshold probability.

31. The speech recognition apparatus of claim 24, wherein the one or more processors are further configured to predict probabilities of the candidates of the output token based on a relationship between the at least one previously input token and the output token.

32. The speech recognition apparatus of claim 24, wherein the one or more processors are further configured to determine a next output token based on the at least one previously input token and the next input token.

33. The speech recognition apparatus of claim 24, wherein the one or more processors are further configured to set a relationship between the next output token and the special token to be less than or equal to a predetermined value when the special token is determined to be the next input token.

34. The speech recognition apparatus of claim 24, wherein the one or more processors are further configured to:
  determine whether the output token is similar to the special token; and
  determine a token having a second highest probability among the candidates to be the output token when the output token is similar to the special token.

35. A speech recognition apparatus, the speech recognition apparatus comprising:
  one or more processors configured to implement at least a first neural network including the processor configured to:
  predict probabilities of candidates of an output token based on at least one previously input token;
  select the output token from the candidates based on a combination of probabilities of the candidates predicted by one or more second neural networks interworking with the first neural network and probabilities of the candidates predicted by the first neural network;
  compare a probability of the output token in the first neural network and a probability of the output token in a determined neural network among the one or more second neural networks which has a highest probability of the output token; and
  determine a next input token in the first neural network by selecting one of the output token and a pre-defined special token based on a result of the comparing.

36. The speech recognition apparatus of claim 35, wherein the one or more processors are further configured to:
  select the special token to be the next input token of the first neural network when a difference between the probability of the output token in the first neural network and the probability of the output token in the determined neural network is greater than or equal to a threshold value; and
  select the output token to be the next input token of the first neural network when a difference between the probability of the output token in the first neural network and the probability of the output token in the determined neural network is less than the threshold value.

37. The speech recognition apparatus of claim 36, wherein when a difference between the probability of the output token in the first neural network and the probability of the output token in the determined neural network is greater than or equal to the threshold value, a reliability of candidates of a next output token predicted based on the special token is higher than a reliability of candidates of a next output token predicted by the output token.

38. A speech recognition system comprising:
  one or more processors;
  one or more memories, storing instructions that, when executed by the one or more processors, configures the one or more processors to:
  extract a speech feature from an input speech signal and generate an encoded feature;
  determine probabilities of candidates of an output token based on the encoded feature and a previously determined recognition result;
  determine a next output token based on a determined weight of candidates generated by a language model neural network, and a determined weight of candidates determined by a speech recognition neural network; and
  set a relationship between the next output token and a special token to be less than or equal to a predetermined value when the special token is determined to be the next input token.

* * * * *